(12) United States Patent
Long

(10) Patent No.: US 9,272,414 B2
(45) Date of Patent: Mar. 1, 2016

(54) ROBOT ARM ASSEMBLY

(71) Applicants: HONG FU JIN PRECISION INDUSTRY (ShenZhen) CO., LTD., Shenzhen, CA (US); HON HAI PRECISION INDUSTRY CO., LTD., New Taipei (TW)

(72) Inventor: Bo Long, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 286 days.

(21) Appl. No.: 14/049,785

(22) Filed: Oct. 9, 2013

(65) Prior Publication Data

US 2014/0116182 A1 May 1, 2014

(30) Foreign Application Priority Data

Oct. 26, 2012 (CN) .......................... 2012 1 0415384

(51) Int. Cl.
*B25J 9/10* (2006.01)
*B25J 19/00* (2006.01)
*B25J 17/02* (2006.01)

(52) U.S. Cl.
CPC .............. *B25J 9/102* (2013.01); *B25J 17/0291* (2013.01); *B25J 19/0029* (2013.01); *Y10T 74/20323* (2015.01)

(58) Field of Classification Search
CPC ..... B25J 9/102; B25J 19/0029; B25J 17/0291
USPC .......................................................... 901/26
See application file for complete search history.

(56) References Cited

U.S. PATENT DOCUMENTS

| 4,657,472 A * | 4/1987 | Zimmer ............... B25J 17/0283 414/735 |
| 4,690,012 A * | 9/1987 | Dahlquist ............ B25J 17/0283 74/417 |
| 4,703,668 A * | 11/1987 | Peter .................... B25J 17/0283 74/417 |
| 6,389,921 B1 | 5/2002 | Nada |
| 8,429,996 B2 * | 4/2013 | Long .................... B25J 17/0258 74/490.05 |
| 2006/0179964 A1 * | 8/2006 | Hama ........................ B25J 9/06 74/490.05 |
| 2012/0160163 A1 * | 6/2012 | Long .................... B25J 19/0029 118/696 |
| 2014/0076089 A1 * | 3/2014 | Long ........................ B25J 9/102 74/490.06 |

FOREIGN PATENT DOCUMENTS

| JP | 2008073775 A | 4/2008 |
| TW | M316147 | 8/2007 |
| TW | 201226130 A1 | 7/2012 |

* cited by examiner

*Primary Examiner* — Terence Boes
(74) *Attorney, Agent, or Firm* — Novak Druce Connolly Bove + Quigg LLP

(57) ABSTRACT

A robot arm assembly includes a first robot arm, a second robot arm, a third robot arm, a connecting base, a first driving assembly, a second driving assembly, a third driving assembly, and a cable receiving tube. The connecting base includes a housing and a protection cover. A sidewall of the housing defines an opening. The protection cover covers the opening and is mounted on the housing. An end of the housing defines a cable inlet. The first driving assembly rotates the first robot arm. The second driving assembly rotates the second robot arm. The third driving assembly rotates the third robot arm. The cable receiving tube is received in the first robot arm, the second robot arm, and the third robot arm.

20 Claims, 5 Drawing Sheets

ROBOT ARM ASSEMBLY

BACKGROUND

1. Technical Field

The present disclosure relates to robot arm assemblies, and particularly to a robot arm assembly for arranging cables therein.

2. Description of Related Art

Robots are used to perform various tasks, such as spraying or cleaning a workpiece. Robots can have multi-axial arms for achieving high precision movements. Tubes or cables are inserted into the robot arms to provide liquid for spraying or cleaning. However, when robot arms are very long, it is difficult to insert the tubes or cables into a cable inlet and extend these tubes or cables along the robot arms. In addition, the tubes or cables can be easily damaged when they are bent in the robot arms.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
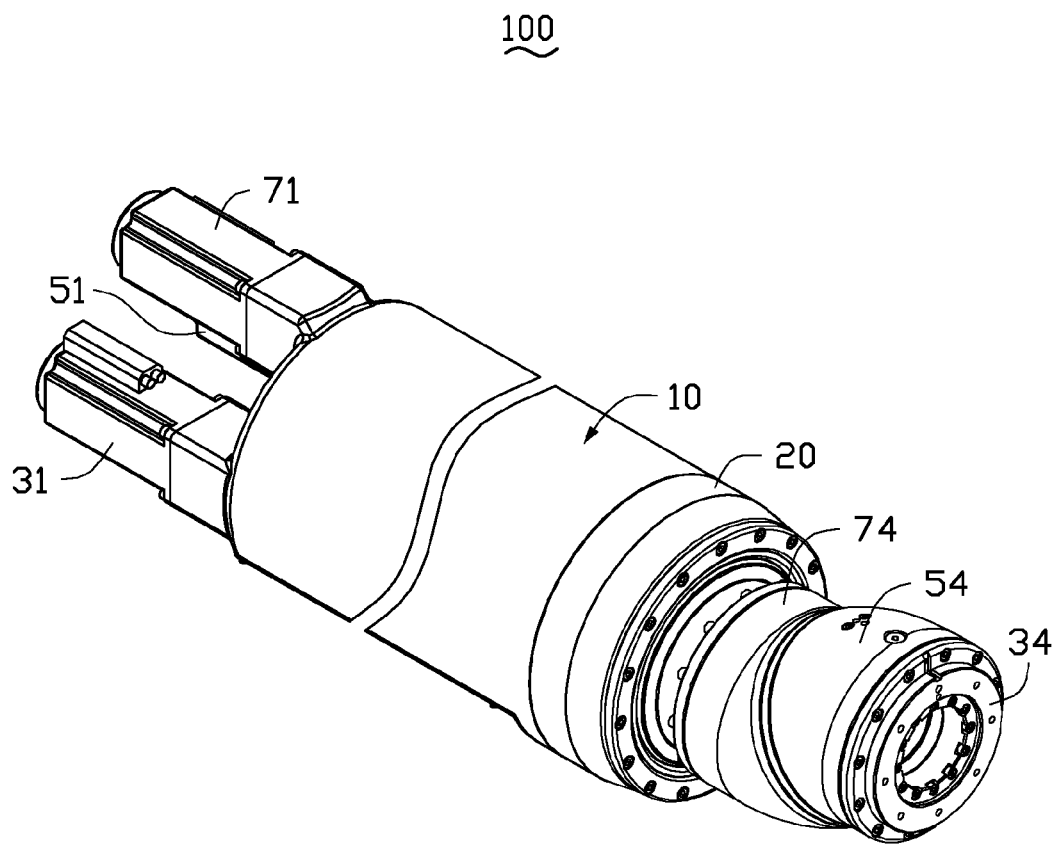
FIG. 1 is an isometric view of an embodiment of a robot arm assembly.
Figure 2:
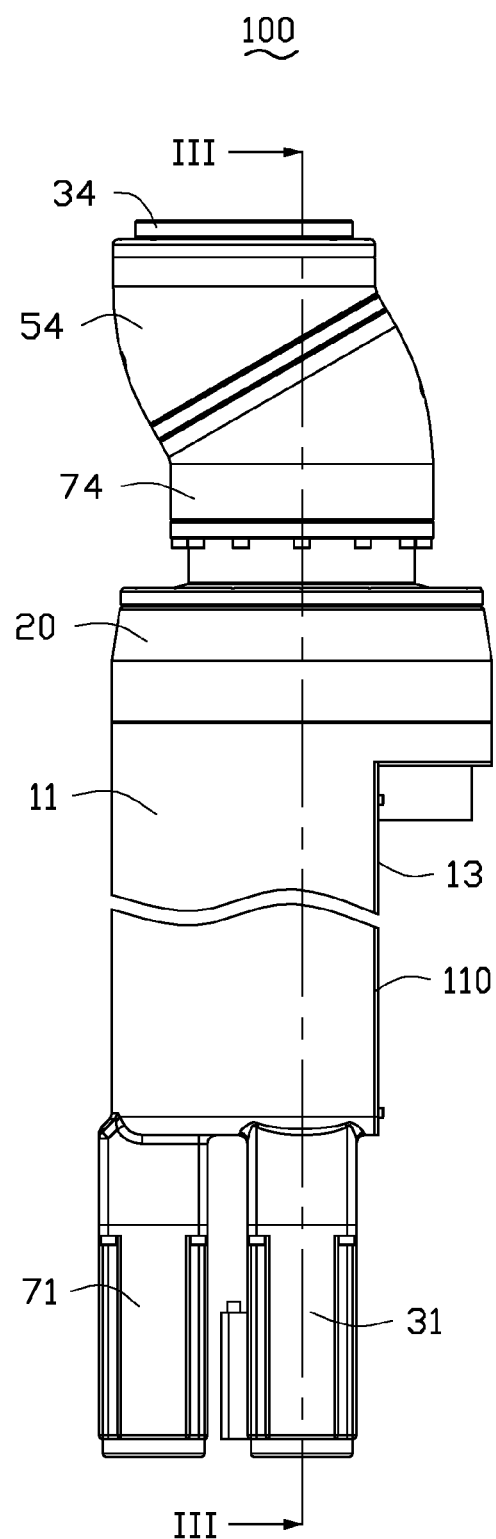
FIG. 2 is a side view of the robot arm assembly shown in FIG. 1.

FIGS. 1 to 5 show one embodiment of a robot arm assembly 100. The robot arm assembly 100 includes a connecting base 10, an axle base 20, a first driving assembly 31, a first transmission mechanism 33, a first robot arm 34, a second driving assembly 51, a second transmission mechanism 53, a second robot arm 54, a third driving assembly 71, a third transmission mechanism 73, a third robot arm 74, a cable receiving tube 90 (shown in FIG. 5), and a plurality of cables 91 (shown in FIGS. 3 and 5) partly received in the cable receiving tube 90. The axle base 20 is positioned at an end of the connecting base 10. The first driving assembly 31, the second driving assembly 51, and the third driving assembly 71 are mounted at the other end of the connecting base 10 away from the axle base 20. The first transmission mechanism 33 connects the first driving assembly 31 to the first robot arm 34, and is partly received in the connecting base 10. The second transmission mechanism 53 connects the second driving assembly 51 to the second robot arm 54, and is partly received in the connecting base 10. The third transmission mechanism 73 connects the third driving assembly 71 to the third robot arm 74, and is partly received in the connecting base 10. The first robot arm 34, the second robot arm 54, and the third robot arm 74 are rotatably connected together in that order. The cable receiving tube 90 is received in the first robot arm 34, the second robot arm 54, and the third robot arm 74. The cables 91 are received in the connecting base 10, the axle base 20, and the cable receiving tube 90, and extend to the first robot arm 34 to provide liquid or gas in a spraying or cleaning process.

The connecting base 10 includes a housing 11 and a protection cover 13 detachably mounted on the housing 11. An opening 110 is defined at a sidewall of the housing 11, and a side view of the housing 11 is substantially L-shaped. An end of the housing 11 defines a cable inlet 111 for the cables 91 to be passing therethrough. The protection cover 13 is detachably mounted on the sidewall of the housing 11, and covers the opening 110.

Figure 3:
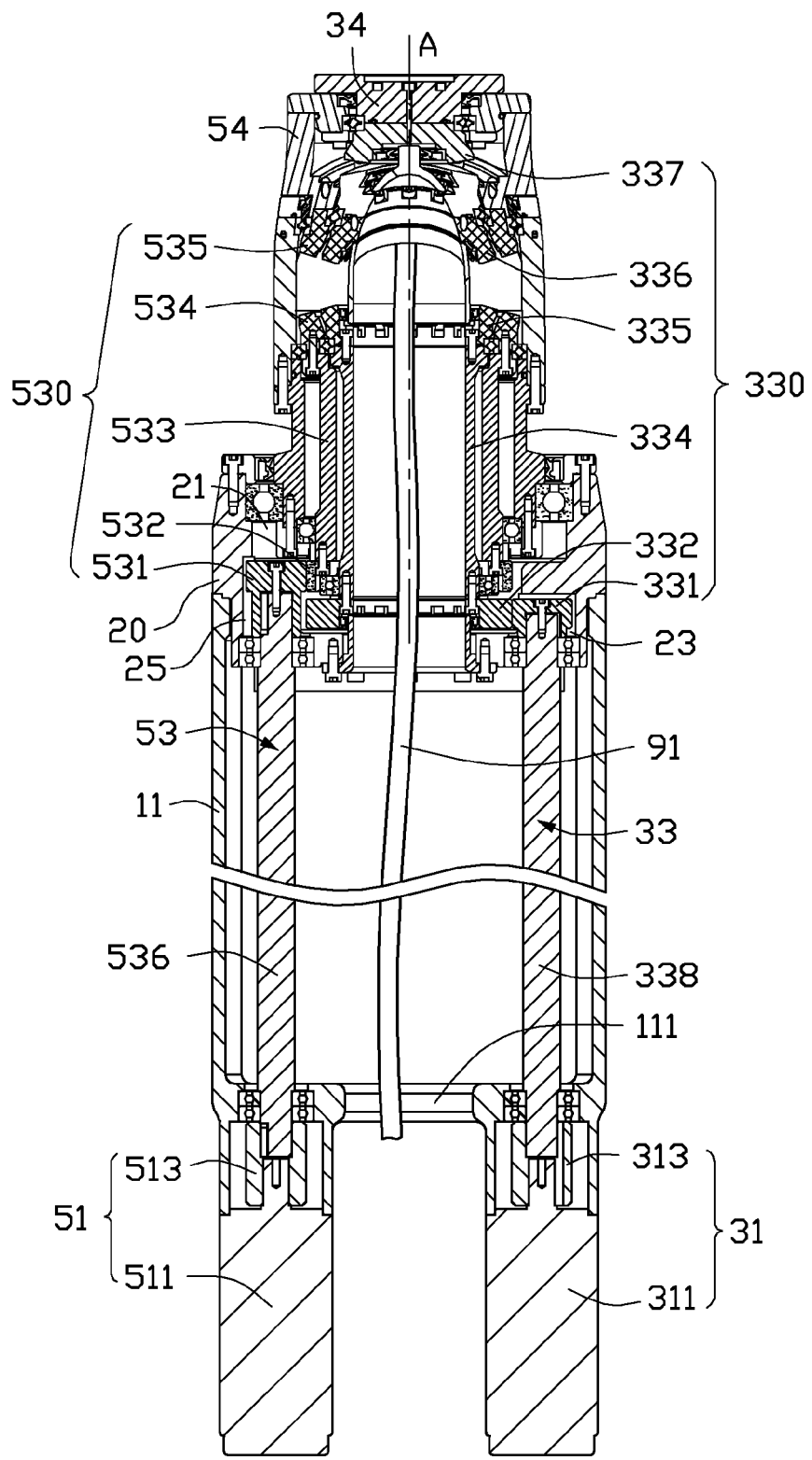
FIG. 3 is a cross-sectional view of the robot arm assembly taken along line III-III of FIG. 2.
Figure 4:
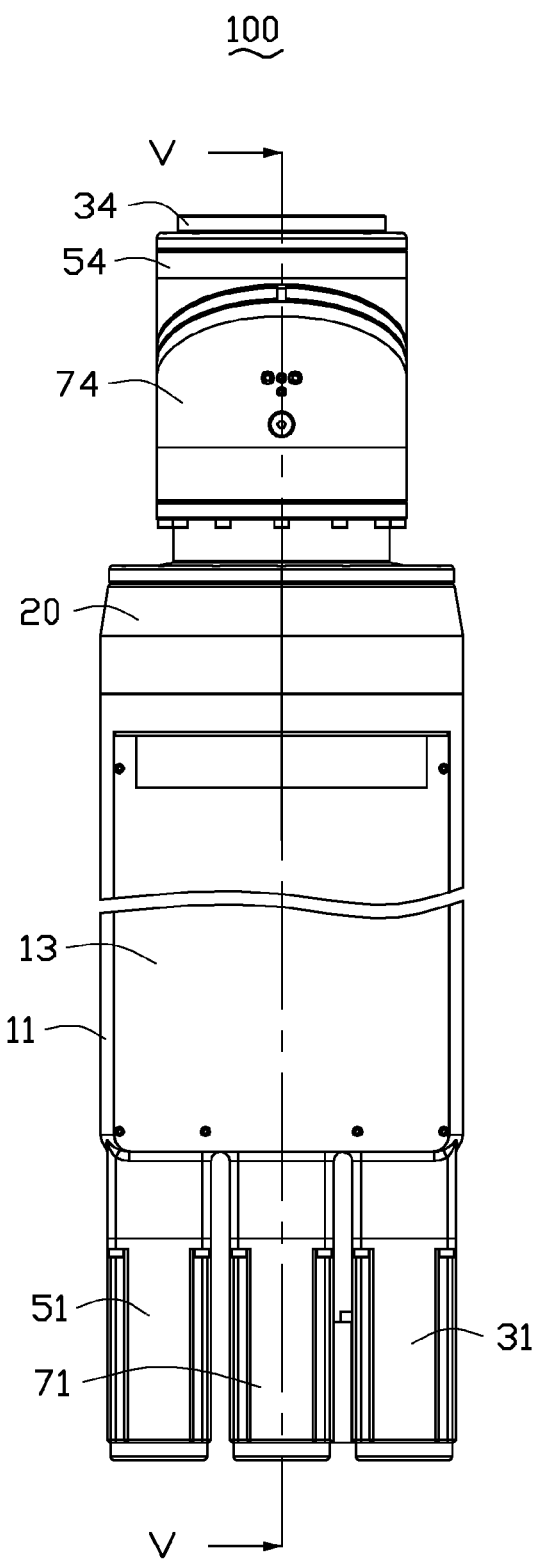
FIG. 4 is a top view of the robot arm assembly of FIG. 1.

The axle base 20 is substantially cylindrical, and is positioned at an end of the housing 11 away from the cable inlet 111. A through hole 21 is defined along an axis of the axle base 20. The axle base 20 defines a first opening hole 23, a second opening hole 25, and a third opening hole 27. The first opening hole 23, the second opening hole 25, and the third opening hole 27 are defined around the through hole 21. The through hole 21 is a stepped hole. The first opening hole 23 and the second opening hole 25 are defined in an end surface of the axle base 20, and are symmetrically positioned along an axis of the axle base 20 (as shown in FIG. 3). The third opening hole 27 is defined at a side of the first opening hole 23 and the second opening hole 25.

The first driving assembly 31 includes a first driver 311 and a first driving end 313 rotatably connected to the first driver 311. The first driver 311 is mounted on an end of the housing 11 adjacent to the cable inlet 111, and the first driving end 313 is received in the housing 11. In the illustrated embodiment, the first driver 311 is a motor.

The first transmission mechanism 33 includes a first gear transmission assembly 330 and a first transmission member 338. The first transmission member 338 is connected to the first driving end 313. The first gear transmission assembly 330 connects the first transmission member 338 to the first robot arm 34. Therefore, the first driver 311 rotates the first robot arm 34 via the first driving end 313, the first transmission member 338, and the first gear transmission assembly 330.

The first transmission member 338 is substantially rod-shaped, and an end of the first transmission member 338 is connected to the first driving end 313, so that the first transmission member 338 is rotatably driven by the first driver 311. The first transmission member 338 extends in the housing 11 and is received in the first opening hole 23 of the axle base 20.

The first gear transmission assembly 330 includes a first gear 331, a second gear 332, a first connecting member 334, a third gear 335, a fourth gear 336, and a fifth gear 337. The first gear 331 is fixed to the first transmission member 338. The second gear 332 meshes with the first gear 331. Opposite ends of the first connecting member 334 are respectively connected to the second gear 332 and the third gear 335. The third gear 335, the fourth gear 336, and the fifth gear 337 mesh with one another in that order. The first robot arm 34 is fixed to the fifth gear 337.

Figure 5:
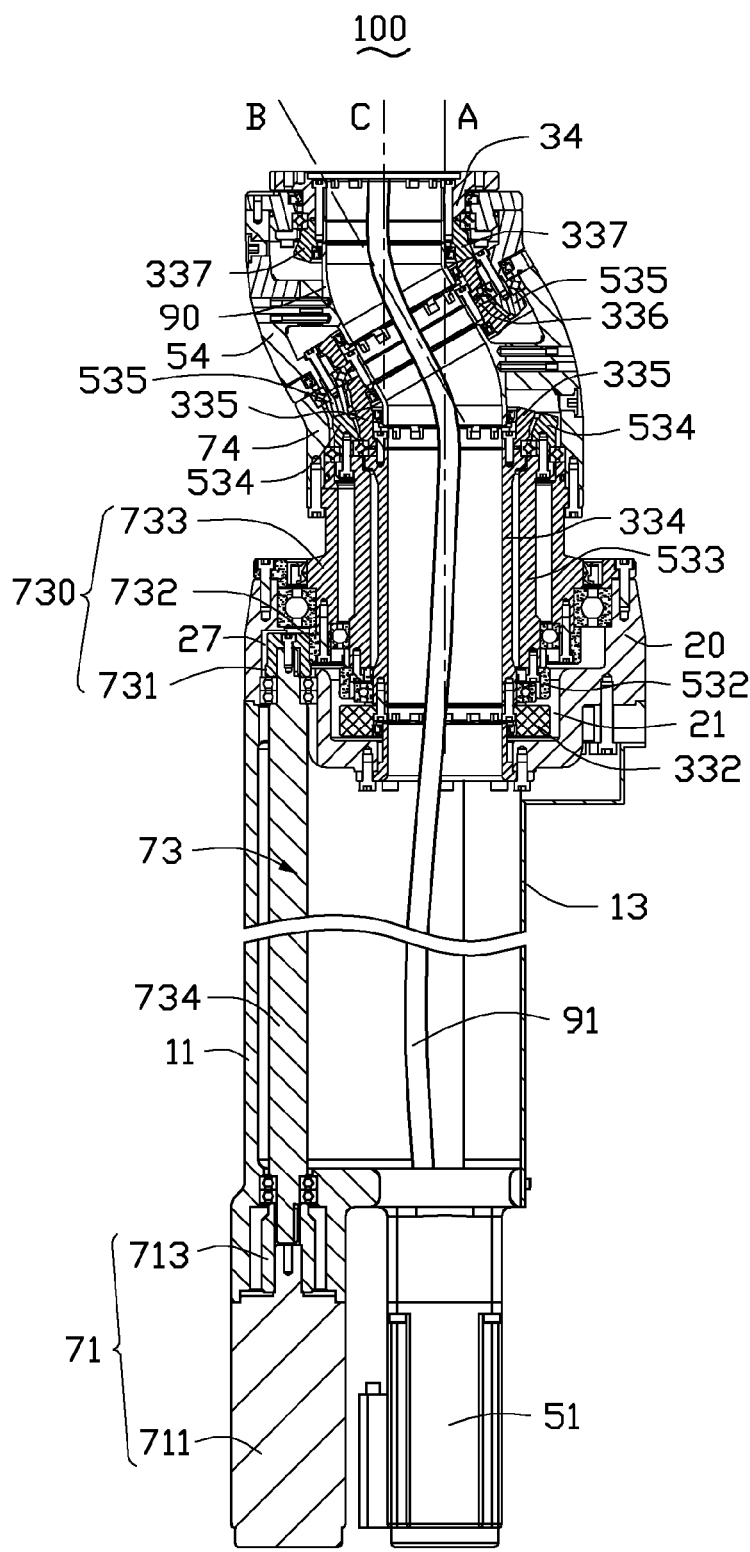
FIG. 5 is a cross-sectional view of the robot arm assembly taken along line V-V of FIG. 4.

The first gear 331 is fixed to an end of the first transmission member 338 away from the first driver 311, and is substantially coaxial with the first transmission member 338. The second gear 332 meshes with the first gear 331. The second gear 332 is positioned at a side of the first gear 331 and is coaxial with the housing 11. A rotation axis of the second gear 332 is defined as an axis A. A diameter of the first connecting member 334 is substantially equal to that of the second gear 332, and the first connecting member 334 is coaxially attached to the second gear 332. The third gear 335 is connected to an end of the first connecting member 334 away from the second gear 332, and is coaxial attached to the first connecting member 334. The fourth gear 336 is positioned at a side of the third gear 335 away from the first connecting member 334, and meshes with the third gear 335. A rotation axis of the fourth gear 336 is defined as an axis B as shown in FIG. 5. The axis B is angled relative to the axis A. The fifth gear 337 is positioned at a side of the fourth gear 336 away from the third gear 335, and meshes with the fourth gear 336. A rotation axis of the fifth gear 337 is defined as an axis C. The axis C is substantially parallel to the axis A. The first robot arm 34 is fixed to a side of the fifth gear 337 away from the fourth gear 336, and is coaxial with the fifth gear 337.

The first driver 311 rotates the first robot arm 34 around the axis A via the first transmission member 338, the first gear 331, the second gear 332, the first connecting member 334, the third gear 335, the fourth gear 336, and the fifth gear 337.

The second driving assembly 51 includes a second driver 511 and a second driving end 513 rotatably connected to the second driver 511. The second driver 511 is mounted on the end of the housing 11 adjacent to the cable inlet 111, and the second driving end 513 is received in the housing 11. The first driver 311 and the second driver 511 are symmetrically positioned along an axis of the housing 11 (shown in FIG. 2). In the illustrated embodiment, the second driver 511 is a motor.

The second transmission mechanism 53 includes a second gear transmission assembly 530 and a second transmission member 536. The second transmission member 536 is connected to the second driving end 513. The second gear transmission assembly 530 connects the second transmission member 536 to the second robot arm 54. Therefore, the second driving member 511 rotates the second robot arm 54 via the second driving end 513, the second transmission member 536, and the second gear transmission assembly 530.

The second transmission member 536 is substantially rod-shaped, and an end of the second transmission member 536 is fixed to the second driving end 513. The second transmission member 536 is received and extends in the housing 11, and is received in the second opening hole 25 of the axle base 20.

The second gear transmission assembly 530 includes a sixth gear 531, a seventh gear 532, a second connecting member 533, an eighth gear 534, and a ninth gear 535. The sixth gear 531 is fixed to the second transmission member 536. The seventh gear 532 meshes with the sixth gear 531. Opposite ends of the second connecting member 533 are respectively connected to the seventh gear 532 and the eighth gear 534. The ninth gear 535 meshes with the eighth gear 534. The second robot arm 54 is fixed to the ninth gear 535.

The sixth gear 531 is fixed to an end of the second transmission member 536 away from the second driver 511, and is substantially coaxial with the second transmission member 536. The seventh gear 532 is positioned at a side of the sixth gear 531 and meshes with the sixth gear 531. A rotation axis of the seventh gear 532 is coaxial with the axis A. A diameter of the second connecting member 533 is substantially equal to that of the seventh gear 532, and the second connecting member 533 is substantially coaxially sleeved on the first connecting member 334. The second connecting member 533 is fixed to the seventh gear 532. The eighth gear 534 is fixed on an end of the second connecting member 533 away from the seventh gear 532, and is substantially coaxial with the second connecting member 533. The eighth gear 534 is sleeved on the third gear 335. The ninth gear 535 is positioned at a side of the eighth gear 534 away from the second connecting member 533 and meshes with the eighth gear 534. The ninth gear 535 is coaxially sleeved on the fourth gear 336. A rotation axis of the ninth gear 535 is coaxial with the axis B.

The second robot arm 54 is fixed to an end of the ninth gear 535 away from the eighth gear 534. The second driver 511 rotates the second robot arm 54 around the axis B via the second transmission member 536, the sixth gear 531, the seventh gear 532, the second connecting member 533, the eighth gear 534, and the ninth gear 535.

The third driving assembly 71 includes a third driver 711 and a third driving end 713 rotatably connected to an end of the third driver 711. The third driver 711 is mounted on the end of the housing 11 adjacent to the cable inlet 111, and the third driving end 713 is received in the housing 11. The third driver 711 is positioned at a side of the second driver 511 and the first driver 311. The first driver 311, the second driver 511, and the third driver 711 are positioned at a same end surface of the housing 11. In the illustrated embodiment, the third driver 711 is a motor.

The third transmission mechanism 73 includes a third gear transmission assembly 730 and a third transmission member 734. The third transmission member 734 is connected to the third driving end 713. The third gear transmission assembly 730 connects the third transmission member 734 to the third robot arm 74. Therefore, the third driving member 711 rotates the third robot arm 74 via the third driving end 713, the third transmission member 734, and the third gear transmission assembly 730.

The third transmission member 734 is substantially rod-shaped, and an end of the third transmission member 734 is fixed to the third driving end 713. The third transmission member 734 is received and extending in the housing 11, and is received in the third opening hole 27 of the axle base 20.

The third gear transmission assembly 730 includes a tenth gear 731, an eleventh gear 732, and a third connecting member 733. The tenth gear 731 is mounted at an end of the third transmission gear assembly 730 away from the third driver 711, and is substantially coaxial with the third transmission member 734. The eleventh gear 732 is positioned at a side of the tenth gear 731, is sleeved on the second connecting member 533 via a bearing, and meshes with tenth gear 731. A rotation axis of the eleventh gear 732 is coaxial with the axis A. The third connecting member 733 is substantially cylindrical and has a diameter substantially equal to that of the eleventh gear 732. The third connecting member 733 is coaxially sleeved on the first connecting member 334, and is fixed to the seventh gear 532.

The third robot arm 74 is fixed to an end of the third connecting member 733 away from the eleventh gear 732, and an end of the third robot arm 74 away from the third connecting member 733 resists against the second robot arm 54. The third driver 711 rotates the third transmission member 734, thereby rotating the third robot arm 74 around the axis A via the tenth gear 731, the eleventh gear 732, and the third connecting member 733. In the illustrated embodiment, the first gear 331, the second gear 332, the third gear 335, the sixth gear 531, the seventh gear 532, the eighth gear 534, the tenth gear 731, and the eleventh gear 732 are spur gears. The fourth gear 336, the fifth gear 337, and the ninth gear 535 are bevel gears.

The cable receiving tube 90 extends from the end of the first connecting member 334 away from the first transmission member 338, passes through the third gear 335 and the fourth gear 336, and then extends to the first robot arm 34. The cable receiving tube 90 is fixed to the second robot arm 54 via fasteners (not shown). The cables 91 are received in the cable inlet 111 and then pass through the housing 11, the axle base 20, and the cable receiving tube 90 to extend to the first robot arm 34.

In use, the protection cover 13 is detached, and the cables 91 for providing liquid or gas are received in the cable inlet 111. The cables 91 extend to the first robot arm 34. The first driver 311 rotates the first robot arm 34 around the axis C. The second driver 511 rotates the second robot arm 54 around the axis B. The third driver 711 rotates the third robot arm 74 around the axis A.

In alternative embodiments, the robot arm assembly 100 can include just two robot arms, such that the third robot arm 74 is omitted. The first gear transmission assembly 330, the second gear transmission assembly 530, and the third gear transmission assembly 730 can be of other gear transmission structures.

Since the protection cover 13 is detachable, even though a length of the housing 11 is long, the cables 91 are easily received in the cable inlet 111 and extends to the axle base 20 via the opening 110. In addition, a distance between the first robot arm 34 and the axle base 20 is short, so that the cables 91 are easily received in one end of the cable receiving tube 90 to the other end of the cable receiving tube 90. Therefore, it is convenient to arrange the cables 91 from the cable inlet 111 to the first robot arm 24. A distance between the axis C and the axis A is short, so that the cables 91 are only bent a small degree when in use, so that the cables 91 are protected from damage.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A robot arm assembly, comprising:
    a first robot arm;
    a second robot arm;
    a connecting base comprising a housing and a protection cover, a sidewall of the housing defining an opening, the protection cover detachably mounted on the sidewall and covering the opening, an end of the housing defining a cable inlet;
    an axle base positioned at an end of the housing away from the cable inlet;
    a first driving assembly mounted on the end of the housing defining the cable inlet;
    a first transmission mechanism comprising:
        a first transmission member connected to the first driving assembly, the first transmission member received in the housing and extending to the axle base, and
        a first gear transmission assembly connecting the first transmission member and the first robot arm, and received in the axle base;
    a second driving assembly mounted on the end of the housing adjacent to the cable inlet;
    a second transmission mechanism comprising:
        a second transmission member connected to the second driving assembly, the second transmission member received in the housing, and extending to the axle base, and
        a second gear transmission assembly connecting the second transmission member and the second robot arm, and received in the axle base, the second gear transmission assembly rotatably sleeved on the first gear transmission assembly;
    a cable receiving tube passing through and received in the first gear transmission assembly and the first robot arm.

2. The robot arm assembly of claim 1, wherein the first gear transmission assembly comprises a first gear, a second gear, a first connecting member, a third gear, a fourth gear, and a fifth gear, the first gear is fixed to the first transmission member, the second gear meshes with the first gear, opposite ends of the first connecting member are respectively fixed to the second gear and the third gear; the second gear, the first connecting member, and the third gear are coaxially positioned; the fourth gear meshes with the third gear, a rotation axis of the fourth gear is inclined to a rotation axis of the third gear, the fifth gear meshes with the fourth gear, a rotation axis of the fifth gear is inclined to the rotation axis of the fourth gear, and is substantially parallel to the rotation axis of the third gear, the cable receiving tube is received in the third gear, the fourth gear, and the first robot arm.

3. The robot arm assembly of claim 2, wherein the second gear transmission assembly comprises a sixth gear, a seventh gear, a second connecting member, a eighth gear, and a ninth gear, the sixth gear is fixed to the second transmission member, the seventh gear meshes with the sixth gear, opposite ends of the second connecting member are respectively fixed to the seventh gear and the eighth gear, the ninth gear meshes with the eighth gear; the seventh gear, the second connecting member, and the eighth gear are coaxially positioned, a rotation axis of the ninth gear is inclined to a rotation axis of the eighth gear.

4. The robot arm assembly of claim 3, wherein a rotation axis of the seventh gear is coaxial with axes of the second connecting member, the eighth gear, the second gear, the first connecting member, and the third gear; the seventh gear and the second connecting member are sleeved on the first connecting member, the eighth gear is sleeved on the third gear, the ninth gear is coaxially sleeved on the fourth gear.

5. The robot arm assembly of claim 4 further comprising a third robot arm, a third driving assembly, and a third transmission mechanism, wherein the third robot arm is rotatably connected to the second robot arm, the third transmission mechanism comprises a third transmission member and a third gear transmission assembly, the third driving assembly is mounted at an end of the housing adjacent to the first driving assembly, the third transmission member is mounted on the third driving assembly, and is received in the housing, the third gear transmission assembly connects the third transmission member and the third robot arm.

6. The robot arm assembly of claim 5, wherein the third gear transmission assembly comprises a tenth gear, an eleventh gear, and a third connecting member, the tenth gear is fixed to the third transmission member, the eleventh gear meshes with the tenth gear, opposite ends of the third connecting member are respectively connected to the tenth gear and the third robot arm.

7. The robot arm assembly of claim 6, wherein the eleventh gear and the third connecting member are coaxially positioned, the eleventh gear and the third connecting member are coaxially sleeved on the second connecting member, the third robot arm is sleeved on the eighth gear.

8. The robot arm assembly of claim 7, wherein the axle base is positioned at an end of the housing away from the first driving assembly, the axle base defines a through hole, a first opening hole, a second opening hole, and a third opening hole, the first opening hole, the second opening hole, and the third opening hole are positioned around the through hole, the first transmission member is received in the first opening hole, the first gear is received in the first opening hole, the second transmission member is received in the second opening hole, the sixth gear is received in the second opening hole, the third transmission member is received in the third opening hole, the tenth gear is received in the third opening hole, the second gear, the seventh gear, and the eleventh gear are received in the through hole.

9. The robot arm assembly of claim 8, wherein the first driving assembly comprises a first driver and a first driving end rotatably connected to the first driver, the second driving assembly comprises a second driver and a second driving end rotatably connected to the second driver, the third driving assembly comprises a third driver and a third driving end rotatably connected the third driver, the first driver, the second driver, and the third driver are mounted at the end of housing away from the axle base, the first driving end is fixed to the first transmission member, the second driving end is fixed to the second transmission member, the third driving end is fixed to the third transmission member.

10. The robot arm assembly of claim 9, wherein the first driver and the second driver are symmetrically positioned along an axis of the housing.

11. A robot arm assembly, comprising:
a first robot arm;
a second robot arm rotatably connected to the first robot arm;
a connecting base comprising a housing and a protection cover, the housing being substantially cylindrical, and defining an opening at a sidewall thereof along a direction parallel to an axis of the housing, a shape of the protection cover matching with the opening, and detachably mounted on the sidewall and covering the opening of the housing, an end surface of the housing defining a cable inlet;
an axle base positioned at an end of the housing away from the cable inlet;
a first driving assembly mounted on the end of the housing defining the cable inlet;
a first transmission mechanism comprising:
a first transmission member substantially a rod, and connected to the first driving assembly, the first transmission member received in the housing and extending to the axle base, and
a first gear transmission assembly connecting the first transmission member and the first robot arm, and received in the axle base;
a second driving assembly mounted on the end of the housing adjacent to the cable inlet;
a second transmission mechanism comprising:
a second transmission member substantially a rod, and connected to the second driving assembly, the second transmission member received in the housing, and extending to the axle base, and
a second gear transmission assembly connecting the second transmission member and the second robot arm, and received in the axle base, the second gear transmission assembly rotatably sleeved on the first gear transmission assembly;
a cable receiving tube passing through and received in the first gear transmission assembly and the first robot arm.

12. The robot arm assembly of claim 11, wherein the first gear transmission assembly comprises a first gear, a second gear, a first connecting member, a third gear, a fourth gear, and a fifth gear, the first gear is fixed to the first transmission member, the second gear meshes with the first gear, the first connecting member substantially cylindrical, and opposite ends of the first connecting member are respectively fixed to the second gear and the third gear; the second gear, the first connecting member, and the third gear are coaxially positioned; the fourth gear meshes with the third gear, a rotation axis of the fourth gear is inclined to a rotation axis of the third gear, the fifth gear meshes with the fourth gear, a rotation axis of the fifth gear is inclined to the rotation axis of the fourth gear, and is substantially parallel to the rotation axis of the third gear, the cable receiving tube is received in the third gear, the fourth gear, and the first robot arm.

13. The robot arm assembly of claim 12, wherein the second gear transmission assembly comprises a sixth gear, a seventh gear, a second connecting member, a eighth gear, and a ninth gear, the sixth gear is fixed to the second transmission member, the seventh gear meshes with the sixth gear, the second connecting member substantially cylindrical, and opposite ends of the second connecting member are respectively fixed to the seventh gear and the eighth gear, the second connecting member is sleeved on the first connecting member, the ninth gear meshes with the eighth gear; the seventh gear, the second connecting member, and the eighth gear are coaxially positioned, a rotation axis of the ninth gear is inclined to a rotation axis of the eighth gear.

14. The robot arm assembly of claim 13, wherein a rotation axis of the seventh gear is coaxial with axes of the second connecting member, the eighth gear, the second gear, the first connecting member, and the third gear; the seventh gear and the second connecting member are sleeved on the first connecting member, the eighth gear is sleeved on the third gear, the ninth gear is coaxially sleeved on the fourth gear.

15. The robot arm assembly of claim 14 further comprising a third robot arm, a third driving assembly, and a third transmission mechanism, wherein the third robot arm is rotatably connected to the second robot arm, the third transmission mechanism comprises a third transmission member and a third gear transmission assembly, the third driving assembly is mounted at an end of the housing adjacent to the first driving assembly, the third transmission member is substantially a rod, and is mounted on the third driving assembly, and is received in the housing, the third gear transmission assembly connects the third transmission member and the third robot arm.

16. The robot arm assembly of claim 15, wherein the third gear transmission assembly comprises a tenth gear, an eleventh gear, and a third connecting member, the tenth gear is fixed to the third transmission member, the eleventh gear meshes with the tenth gear, the third connecting member is substantially cylindrical, and opposite ends of the third connecting member are respectively connected to the tenth gear and the third robot arm, the third connecting member is sleeved on the second connecting member.

17. The robot arm assembly of claim 16, wherein the eleventh gear and the third connecting member are coaxially positioned, the eleventh gear and the third connecting member are coaxially sleeved on the second connecting member, the third robot arm is sleeved on the eighth gear.

18. The robot arm assembly of claim 17, wherein the axle base is positioned at an end of the housing away from the first driving assembly, the axle base defines a through hole, a first opening hole, a second opening hole, and a third opening hole, the first opening hole, the second opening hole, and the third opening hole are positioned around the through hole, the first transmission member is received in the first opening hole, the first gear is received in the first opening hole, the second transmission member is received in the second opening hole, the sixth gear is received in the second opening hole, the third transmission member is received in the third opening hole, the tenth gear is received in the third opening hole, the second gear, the seventh gear, and the eleventh gear are received in the through hole.

19. The robot arm assembly of claim 11, wherein the first driving assembly comprises a first driver and a first driving end rotatably connected to the first driver, the second driving assembly comprises a second driver and a second driving end rotatably connected to the second driver, the first driver and the second driver are mounted at the end of housing away from the axle base, the first driving end is fixed to the first transmission member, the second driving end is fixed to the second transmission member.

20. The robot arm assembly of claim 19, wherein the first driver and the second driver are symmetrically positioned along an axis of the housing.

* * * * *